United States Patent
Beeby et al.

(10) Patent No.: US 12,467,861 B2
(45) Date of Patent: Nov. 11, 2025

(54) METHOD OF QUANTIFYING THE REMOVAL OF HYDROCARBON COMPONENT FROM A SOILED FABRIC BY A WASHING PROCESS

(71) Applicant: The Procter & Gamble Company, Cincinnati, OH (US)

(72) Inventors: Andrew Beeby, Newcastle upon Tyne (GB); Anju Deepali Massey Brooker, Newcastle upon Tyne (GB); Joseph Copsey, Newcastle upon Tyne (GB); Matthew Alexander Leivers, Durham (GB); Andrei Markin, Bristol (GB); Andrew Philip Moon, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 223 days.

(21) Appl. No.: 18/210,240

(22) Filed: Jun. 15, 2023

(65) Prior Publication Data

US 2023/0324294 A1 Oct. 12, 2023

Related U.S. Application Data

(63) Continuation of application No. PCT/US2022/034436, filed on Jun. 22, 2022.

(30) Foreign Application Priority Data

Jun. 23, 2021 (EP) .................................... 21181276

(51) Int. Cl.
*G01N 21/359* (2014.01)
*D06L 1/12* (2006.01)
(Continued)

(52) U.S. Cl.
CPC .............. *G01N 21/359* (2013.01); *D06L 1/12* (2013.01); *G01N 21/33* (2013.01); *G01N 21/3563* (2013.01); *G01N 33/367* (2013.01)

(58) Field of Classification Search
CPC .... D06F 34/18; G01N 21/33; G01N 21/3563; G01N 21/359; G01N 33/367
See application file for complete search history.

(56) References Cited

U.S. PATENT DOCUMENTS

2004/0119972 A1 6/2004 Smit-kingma et al.
2017/0275565 A1 9/2017 Scialla et al.
(Continued)

FOREIGN PATENT DOCUMENTS

CN 107782692 A 3/2018
EP 3224335 B1 10/2018

OTHER PUBLICATIONS

PCT Search Report and Written Opinion for PCT/US2022/034436 dated Oct. 17, 2022; 15 pages.
(Continued)

*Primary Examiner* — David G Cormier
(74) *Attorney, Agent, or Firm* — Gary J. Foose

(57) ABSTRACT

A method of quantifying the removal of hydrocarbon component from a soiled fabric by a washing process, wherein the soiled fabric includes at least about 0.5 wt % hydrocarbon component wherein the method uses near infra-red (NIR) analysis, wherein the method includes the steps of: (a) performing non-contact NIR analysis of the soiled fabric to determine the concentration of hydrocarbon component present on the soiled fabric at multiple points; (b) washing the soiled fabric to obtain a washed fabric; (c) performing non-contact NIR analysis of the washed fabric to determine the concentration of hydrocarbon component present on the washed fabric at the same multiple points that were used in
(Continued)

step (a); and (d) quantifying the removal of hydrocarbon component from the soiled fabric by the washing process.

11 Claims, 2 Drawing Sheets

(51) Int. Cl.
*G01N 21/33* (2006.01)
*G01N 21/3563* (2014.01)
*G01N 33/36* (2006.01)

(56) References Cited

U.S. PATENT DOCUMENTS

2017/0313958 A1* 11/2017 Britton .................... C11D 1/72
2018/0238796 A1   8/2018 Cooke et al.

OTHER PUBLICATIONS

EPO Search Report and Opinion for Application No. 21181276.3 dated Dec. 1, 2021, 13 pages.
Gordon et al. "Performance aspects of water conservation techniques for appliances", National Institute of Standards and Technology, Online retrieved from "https://nvlpubs.nist.gov/nistpubs/Legacy/I R/nbsir81 -2291", Dec. 31, 1981, XP061041208, 46 Pages.

* cited by examiner

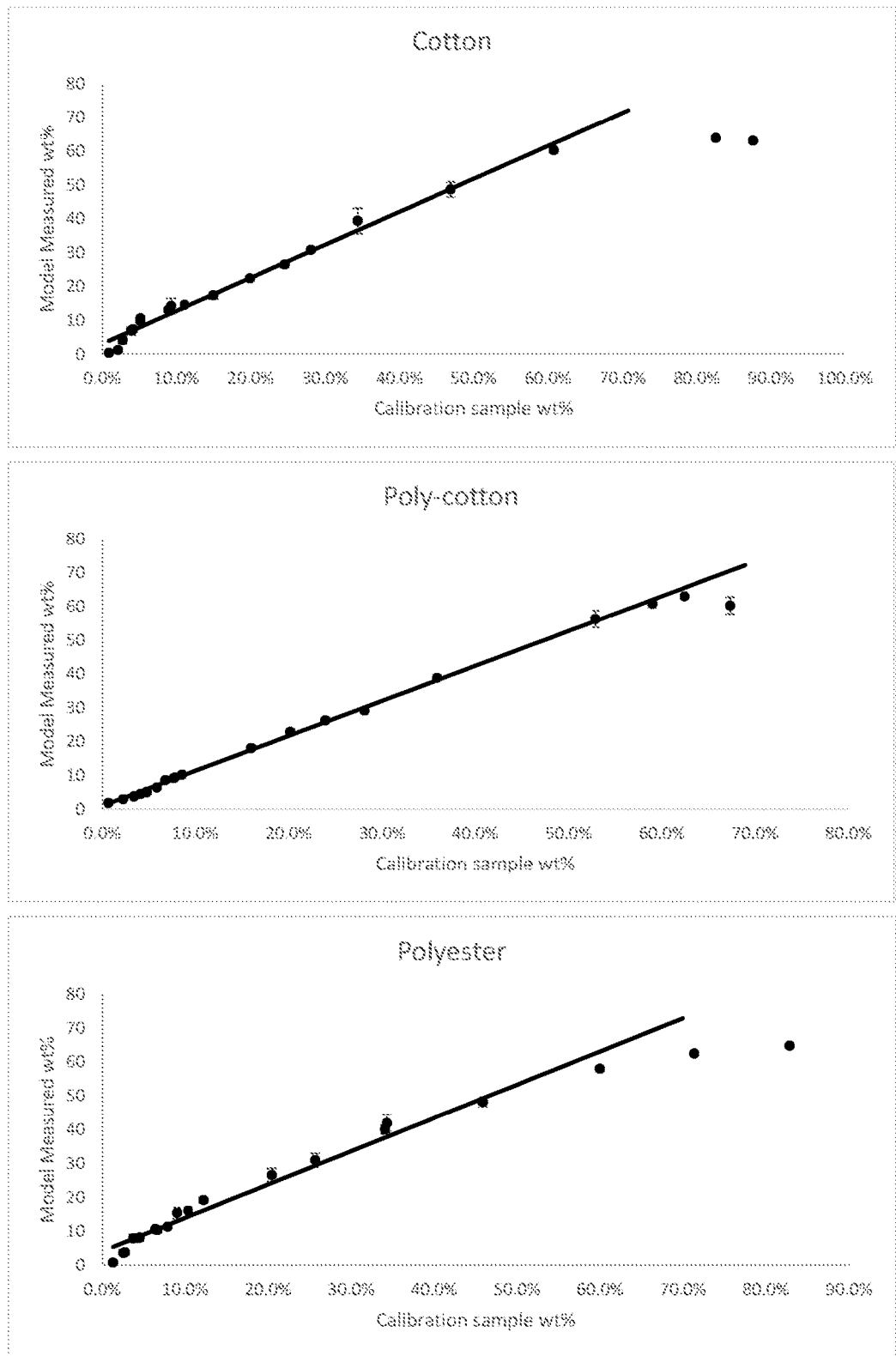
*Figure 1: Lipid soil content determined using a machine learning model using SWIR spectroscopy plotted against the known soil content of the calibration samples*

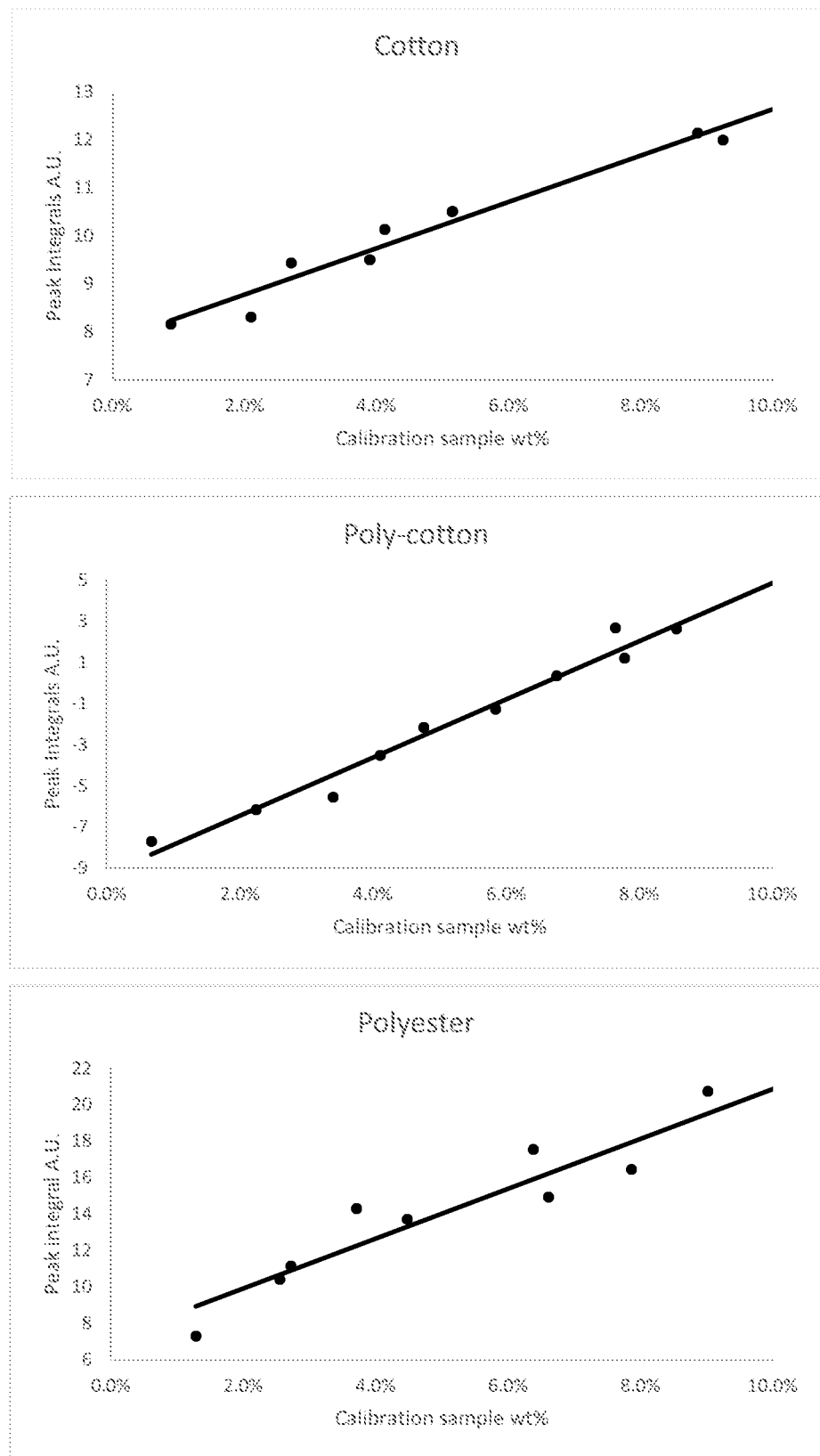
*Figure 2: Integrals of the lipid peaks from 1680 – 1860 nm plotted against the known lipid concentration of the calibration samples from 1 to 10 wt%*

METHOD OF QUANTIFYING THE REMOVAL OF HYDROCARBON COMPONENT FROM A SOILED FABRIC BY A WASHING PROCESS

FIELD OF THE INVENTION

The present invention provides a method of quantifying the removal of hydrocarbon component from a soiled fabric by a washing process. The method of the invention does not require the use of any colourant and can quantify the removal of hydrocarbon component from a soiled fabric in a non-contact and non-destructive manner.

BACKGROUND OF THE INVENTION

Greasy soils are commonly experienced by laundry detergent users. Common greasy soils can include edible fats and oils of animal and vegetable origin, cosmetic and mechanical greases, and highly convoluted organic body soils. Practically, simple greasy food soils, such as olive oil and lard, often appear optically transparent to opaque when present on substrates. This presents challenges for visual and instrumental assessment of such stains following washing process. To address this, such soils are commonly dyed using oleophilic colourants and analysed colourimetrically. However, this method has limitations, in that it requires prior inclusion of the colourant, and thus can only be achieved for stains prepared in the laboratory setting. More complex greasy soils, such as mechanical and body soils, are complex mixtures of hydrocarbons, proteins, carbohydrates, pigments, adjuncts, and mixtures thereof. The aforementioned colourimetric method cannot be used with such multicomponent real-world soils, or other soils which cannot effectively be dyed or otherwise coloured. For such soils, attenuated total reflectance [ATR] spectroscopy is the analytical standard. ATR is a contact technique, and thus can damage the integrity of the sample. Techniques using intense beams of light can also heat the sample causing degradation.

Thus, there is a need for a non-contact and non-destructive analytical techniques which can be applied in the analysis of both simple and complex soils containing greasy hydrocarbons, which are present on substrates subject to washing process.

The present invention provides a method of quantifying the removal of hydrocarbon component from a soiled fabric by a washing process. The method of the invention does not require the use of any colourant and can quantify the removal of hydrocarbon component from a soiled fabric in a non-contact and non-destructive manner.

SUMMARY OF THE INVENTION

The present invention provides a method of quantifying the removal of hydrocarbon component from a soiled fabric by a washing process, wherein the soiled fabric comprises at least 0.5 wt % hydrocarbon component wherein the method uses near infra-red (NIR) analysis, wherein the method comprises the steps of: (a) performing non-contact NIR analysis of the soiled fabric to determine the concentration of hydrocarbon component present on the soiled fabric at multiple points; (b) washing the soiled fabric to obtain a washed fabric; (c) performing non-contact NIR analysis of the washed fabric to determine the concentration of hydrocarbon component present on the washed fabric at the same multiple points that were used in step (a); and (d) quantifying the removal of hydrocarbon component from the soiled fabric by the washing process.

BRIEF DESCRIPTION OF THE DRAWINGS

FIG. 1 shows the average measured soil wt % for each calibration sample using the machine learning methodology.

FIG. 2 shows the integrals of the lipid peaks, 1680-1860 nm, against the known soil wt % of the calibration samples for cotton, poly-cotton, and polyester.

DETAILED DESCRIPTION OF THE INVENTION

Method of Quantifying the Removal of Hydrocarbon Component from a Soiled Fabric by a Washing Process The method of quantifying the removal of hydrocarbon component from a soiled fabric by a washing process comprises the steps of:
(a) performing non-contact NIR analysis of the soiled fabric to determine the concentration of hydrocarbon component present on the soiled fabric at multiple points;
(b) washing the soiled fabric to obtain a washed fabric;
(c) performing non-contact NIR analysis of the washed fabric to determine the concentration of hydrocarbon component present on the washed fabric at the same multiple points that were used in step (a); and
(d) quantifying the removal of hydrocarbon component from the soiled fabric by the washing process.

The soiled fabric comprises at least 0.5 wt % hydrocarbon component wherein the method uses near infra-red (NIR) analysis.

Typically, during steps (a) and (c), the NIR analysis is carried out at a light wavelength of from 750 nm to 2500 nm, or from 900 nm to 2500 nm.

The method may also perform additional non-contact optical analysis selected from UV analysis, visible-light analysis, and a combination thereof. Preferably, the UV analysis is carried out at a light wavelength of from 250 nm to below 400 nm. Preferably, the visible-light analysis is carried out at a wavelength of from 400 nm to less than 750 nm.

Preferably the NIR analysis is non-destructive.

NIR Analysis

Typically, the NIR analysis is carried out by a spectrometer. Typically, the spectrometer employs two separate light-source and detector modules to cover the full spectral range. The outputs from the two sources are typically combined using a beam-splitter and are directed onto the sample via a two-core bifurcated fiber optic. Typically, the short-wave end of the spectrum (400-1200 nm) is generated by the output of a tungsten-halogen lamp (e.g. Ocean Optics HP2000) combined with a 2.0 cm pathlength water filter. The water filter typically that has the effect of removing any radiation of wavelengths longer than 1250 nm. Typically, the output of this lamp is continuous. Typically, the short wave infra-red (SWIR) component of the spectrum is generated by a second tungsten lamp and interferometer (e.g. ArcOptix F FTIR-OEM200-NIR-20 and FTIR-OEM000-CAF2 respectively). This typically creates a modulated output in the range 900-2600 nm. The two beams are typically combined using a beam splitter and imaged onto the single end of a bifurcated fiber (e.g. Ocean Optics, 400 μm diameter) with a fiber coupling lens. Typically, the outputs of the bifurcated fibers illuminate the target area via two collimating lenses (e.g. Ocean Optics) at an angle of ±45° to the surface normal.

Typically, the back-scattered light from the sample is collected by an off-axis parabolic mirror (e.g. Thorlabs, f=50.4 mm, φ=0.5"). This is typically arranged so that its focus is at the point of overlap of the two illumination beams. Typically, the collected light is split with a 10% reflective beam-splitter, usually with the minor portion imaged onto a fiber and the spectral profile collected by a spectrograph -CCD (e.g. Ocean Optics May 2000 Pro), and the major portion being collected onto a cooled InGaAs photodiode (e.g. Arcoptix FTIR-OEM100-09-025-2TE).

By using a CW source and quasi-CW detector for the vis-NIR spectral region and a modulated source with an AC-coupled detector for the NIR-SWIR, the two signals can be acquired effectively independently of one another. The reduced sensitivity in the NIR/SWIR region can be mitigated by incorporating the cooled InGaAs detector in the probe head itself, avoiding any loss incurred by coupling it by a second fiber optic. The UV-NIR spectrum can be recorded using a commercial spectrograph-CCD, (e.g. Ocean Optics MayaPro, HC1 grating, 100 μm slit), which is fibre coupled to the probe head. The superior sensitivity and excellent signal to noise performance of this spectrometer accommodates the losses of the fibre coupling whilst offering excellent spectral resolution.

The system can be controlled by a custom interface written in LabVIEW, and acquires spectra continually from the two spectrometers. Background/dark-current spectra and spectra from a white reference tile are typically recorded and stored, allowing the two reflectance spectra to be recorded and displayed in real-time alongside a video-microscope output and when selected the spectra and an image are captured and stored for analysis.

Typically, the spatial resolution of the area being investigated is in the order of from 1.0 mm to 2.0 mm diameter, and typically multiple points being analyzed.

Typically, the spectrometer is configured such that the detector is local to the sample, and the light is delivered from the spectrometer by fibre optic means. This configuration improves the sensitivity and allows for a smaller probe head to be used.

Step (a)

Step (a) performs non-contact NIR analysis of the soiled fabric to determine the concentration of hydrocarbon component present on the soiled fabric at multiple points.

Step (b)

Step (b) washes the soiled fabric to obtain a washed fabric. The soiled fabric can be washed by any suitable means. Typically, an aqueous based detergent wash bath is used. Any suitable laundry detergent may be used.

Step (c)

Step (c) performs non-contact NIR analysis of the washed fabric to determine the concentration of hydrocarbon component present on the washed fabric at the same multiple points that were used in step (a).

Step (d)

Step (d) quantifies the removal of hydrocarbon component from the soiled fabric by the washing process.

Preferably, during step (d), the amount of hydrocarbon component removed from the soiled fabric by the washing process is quantified by:

$$\% \text{ removal} = \frac{\text{soiled wt}\% - \text{washed wt}\%}{\text{soiled wt}\%}.$$

Soiled Fabric

Typically, the soiled fabric comprises from 1.0 wt % to 60 wt % hydrocarbon component, or from 2.0 wt % to 60 wt %, or from 3.0 wt % to 60 wt %, or from 4.0 wt % to 60 wt %, or even from 5.0 wt % to 60 wt % hydrocarbon content. Any suitable soiled fabric can be used, such as polyester, cotton including polycotton, and blends including a 35/65 blend of polyester/cotton.

Hydrocarbon Component

The hydrocarbon content is typically present as part of a complex soil. The complex soil may comprise from 0.1 wt % to 80 wt % hydrocarbon component and from 20 wt % to 99.9 wt % non-hydrocarbon component.

Typically, the hydrocarbon is selected from diglycerides, triglycerides, fatty acids, saturated and unsaturated hydrocarbons, and any combination thereof.

The hydrocarbon content may be selected from hydrocarbon deposition ingredients selected from polymers, surfactants, polydimethylsiloxane and any combination thereof.

Examples

Sample Preparation

Soiled fabric samples comprising from 1 wt % to 60 wt % hydrocarbon content were prepared.

Shortwave Infrared Fibre-optic Reflection Spectroscopy (SWIR-FORS)

Data Collection

1. SWIR reflectance spectra are recorded from 400-2500 nm, the average of 2 spectra, integrating over 500 ms
2. Background spectra of a white certified reflectance standard (SRS-99-010) is recorded
3. Each model soil calibration sample is placed under the instrument and the separation between the detector and the sample set to 5 cm
4. Five spectra are recorded for each sample at five different locations around the centre of the fabric sample Data Analysis The data analysis is performed by the following method.
1. Recorded spectra, 900-2500 nm, are first smoothed using a 4-point moving average function
2. The spectra are then normalised using a Standard Normal Variate (SNV) function
3. For quantitative analysis the original spectra measured as % reflectance is transformed into Kubelka-Munk units as these band intensities are proportional to concentration
4. Integration of the peaks between 1680-1860 nm are performed
5. The integrated peaks area is plotted against the known weight % of the samples to produce a calibration curve for the analysis of unknown samples Calibration Sets Three calibration sets are prepared from 1 wt % up to 70 wt % on cotton, polycotton, and polyester. Calibration samples below 15 wt % are prepared using a droplet printer technique. Above 15 wt % a pipette is used to add the required volume of soil solution onto the fabric. For each calibration sample the SWIR spectrum is recorded at five points on the surface as detailed above.

FIG. 1 shows the average measured soil wt % for each calibration sample using the machine learning methodology. For all fabrics investigated there is a good correlation between the known mass soil mass of the calibration samples and the measured soil content between 10 wt % and 60 wt %. Above 60 wt % a plateau in the measured soil content is observed. With poly-cotton the model is accurate, within 2%.

FIG. 2 shows the integrals of the lipid peaks, 1680-1860 nm, against the known soil wt % of the calibration samples for cotton, poly-cotton, and polyester. For all three fabrics a strong linear relationship between the integrated lipid peak areas and the soil content are observed. The poly-cotton shows the least variation from the linear relationship. The cotton samples exhibit slightly higher variation with each sample and between them but not significantly more than the poly-cotton samples. Whilst the polyester data show greater variation compared to the other two fabrics there is still a clear trend with which to produce a calibration curve, although with a slightly higher margin of error.

The following tables compare the soil content of the calibration samples, the mean soil content as measured by a machine learning model, the mean lipid peak integrals, as well as the associated standard deviations for both measurements.

| Cotton | | | | |
| --- | --- | --- | --- | --- |
| Printed Wt % | SWIR model Wt % | SWIR model S.D | SWIR Integral A.U | SWIR Integral S.D |
| 0.89% | 0.39 | 0.17 | 8.16 | 0.75 |
| 2.10% | 1.32 | 0.64 | 8.30 | 0.49 |
| 2.71% | 4.16 | 1.02 | 9.43 | 0.65 |
| 3.90% | 6.98 | 1.28 | 9.50 | 0.57 |
| 4.13% | 7.36 | 0.68 | 10.13 | 0.34 |
| 5.15% | 9.73 | 0.43 | 10.50 | 0.47 |
| 5.15% | 10.61 | 0.50 | 10.50 | 0.80 |
| 8.87% | 13.15 | 0.52 | 12.14 | 0.69 |
| 9.25% | 14.29 | 2.27 | 11.99 | 1.11 |
| 11.10% | 14.60 | 0.61 | 13.15 | 0.28 |
| 14.97% | 17.37 | 0.96 | 14.21 | 0.90 |
| 19.90% | 22.39 | 0.57 | 17.38 | 0.62 |
| 24.55% | 26.53 | 0.77 | 20.16 | 0.59 |
| 28.11% | 30.85 | 0.81 | 22.44 | 0.48 |
| 34.38% | 39.42 | 3.79 | 26.36 | 2.14 |
| 46.94% | 48.66 | 2.27 | 30.61 | 0.75 |
| 60.78% | 60.32 | 0.65 | 35.97 | 0.83 |
| 82.63% | 63.91 | 0.10 | 40.54 | 0.43 |
| 87.63% | 63.13 | 0.30 | 39.39 | 1.10 |

| PolyCotton | | | | |
| --- | --- | --- | --- | --- |
| Printed Wt % | SWIR model Wt % | SWIR model S.D | SWIR Integral A.U | SWIR Integral S.D |
| 0.67% | 1.91 | 0.25 | -7.71 | 1.50 |
| 2.24% | 3.03 | 0.19 | -6.17 | 1.15 |
| 3.40% | 3.80 | 0.24 | -5.56 | 0.79 |
| 4.11% | 4.58 | 0.19 | -3.52 | 0.34 |
| 4.76% | 5.09 | 0.30 | -2.16 | 1.15 |
| 5.84% | 6.50 | 0.40 | -1.28 | 0.53 |
| 6.76% | 8.62 | 0.49 | 0.33 | 1.02 |
| 7.64% | 9.19 | 0.71 | 2.67 | 0.96 |
| 7.78% | 9.38 | 0.76 | 1.20 | 0.87 |
| 8.56% | 10.26 | 0.33 | 2.63 | 0.55 |
| 15.99% | 18.12 | 0.72 | 5.80 | 0.52 |
| 20.18% | 22.86 | 0.81 | 8.16 | 1.12 |
| 23.94% | 26.25 | 0.69 | 9.38 | 1.07 |
| 28.12% | 29.17 | 0.54 | 9.85 | 0.39 |
| 35.91% | 38.85 | 0.93 | 17.40 | 1.01 |
| 52.89% | 56.29 | 2.49 | 23.72 | 0.86 |
| 58.97% | 60.82 | 0.97 | 25.77 | 0.46 |
| 62.44% | 63.06 | 0.63 | 28.90 | 0.33 |
| 67.34% | 60.31 | 2.51 | 20.09 | 4.96 |

| Polyester | | | | |
| --- | --- | --- | --- | --- |
| Printed Wt % | SWIR model Wt % | SWIR model S.D | SWIR Integral A.U | SWIR Integral S.D |
| 1.29% | 0.84 | 0.26 | 7.29 | 1.87 |
| 2.55% | 3.66 | 1.01 | 10.40 | 1.00 |
| 2.72% | 3.89 | 0.77 | 11.14 | 1.08 |
| 3.71% | 7.91 | 1.07 | 14.30 | 1.13 |
| 4.48% | 8.11 | 1.06 | 13.71 | 1.13 |
| 6.61% | 10.34 | 0.64 | 14.92 | 1.30 |
| 6.38% | 10.66 | 0.13 | 17.53 | 0.99 |
| 7.87% | 11.40 | 0.30 | 16.45 | 1.54 |
| 9.02% | 15.41 | 1.63 | 20.74 | 1.35 |
| 10.38% | 16.13 | 1.12 | 20.63 | 1.34 |
| 12.24% | 19.24 | 0.74 | 24.28 | 0.58 |
| 20.45% | 26.60 | 1.92 | 28.95 | 1.01 |
| 25.68% | 30.94 | 2.01 | 33.50 | 0.70 |
| 34.09% | 40.05 | 1.29 | 37.44 | 0.84 |
| 34.29% | 41.92 | 2.56 | 37.20 | 1.41 |
| 45.88% | 48.22 | 1.33 | 41.37 | 0.36 |
| 60.00% | 57.98 | 0.59 | 44.97 | 0.36 |
| 71.41% | 62.51 | 0.29 | 48.35 | 0.84 |
| 82.87% | 64.84 | 0.34 | 49.28 | 0.50 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of quantifying the removal of hydrocarbon component from a soiled fabric by a washing process, wherein the soiled fabric comprises at least about 0.5 wt % hydrocarbon component wherein the method uses near infrared (NIR) analysis, wherein the method comprises the steps of:
    (a) performing non-contact NIR analysis of the soiled fabric to determine the concentration of hydrocarbon component present on the soiled fabric at multiple points;
    (b) washing the soiled fabric to obtain a washed fabric;
    (c) performing non-contact NIR analysis of the washed fabric to determine the concentration of hydrocarbon component present on the washed fabric at the same multiple points that were used in step (a); and
    (d) quantifying the removal of hydrocarbon component from the soiled fabric by the washing process.

2. A method according to claim 1, wherein the hydrocarbon content is present as part of a complex soil, wherein the complex soil comprises from about 0.1 wt % to about 80 wt % hydrocarbon component and from about 20 wt % to about 99.9 wt % non-hydrocarbon component.

3. A method according to claim 1, wherein the hydrocarbon content is selected from diglycerides, triglycerides, fatty acids, saturated and unsaturated hydrocarbons, and any combination thereof.

4. A method according to claim 1, wherein the hydrocarbon content is selected from hydrophobic deposition ingredients selected from polymers, surfactants, polydimethylsiloxane and any combination thereof.

5. A method according to claim 1, wherein the soiled fabric comprises from about 1.0 wt % to about 60 wt % hydrocarbon component.

6. A method according to claim 1, wherein during steps (a) and (c), the NIR analysis is carried out at a light wavelength of from about 750 nm to about 2500 nm.

7. A method according to claim 1, wherein during steps (a) and (c), the NIR analysis is carried out at a light wavelength of from about 900 nm to about 2500 nm.

8. A method according to claim 1, wherein the method also performs additional non-contact optical analysis selected from UV analysis, visible-light analysis, and a combination thereof.

9. A method according to claim 8, wherein the UV analysis is carried out at a light wavelength of from about 250 nm to below about 400 nm, and wherein the visible-light analysis is carried out at a wavelength of from about 400 nm to less than about 750 nm.

10. A method according to claim 1, wherein the NIR analysis is non-destructive.

11. A method according to claim 1, wherein during step (d), the amount of hydrocarbon component removed from the soiled fabric by the washing process is quantified by:

$$\% \text{ removal} = \frac{\text{soiled wt\%} - \text{washed wt\%}}{\text{soiled wt\%}}.$$

* * * * *